United States Patent [19]

Nakamura et al.

[11] Patent Number: 5,767,846

[45] Date of Patent: Jun. 16, 1998

[54] MULTI-MEDIA DOCUMENT REPRODUCING SYSTEM, MULTI-MEDIA DOCUMENT EDITING SYSTEM, AND MULTI-MEDIA DOCUMENT EDITING/REPRODUCING SYSTEM

[75] Inventors: Osamu Nakamura; Takahiro Saito; Takeshi Shimizu, all of Ebina, Japan

[73] Assignee: Fuji Xerox Co., Ltd., Tokyo, Japan

[21] Appl. No.: 540,488

[22] Filed: Oct. 10, 1995

[30] Foreign Application Priority Data

Oct. 14, 1994 [JP] Japan .................................. 6-274306

[51] Int. Cl.$^6$ ...................................................... G06F 15/00
[52] U.S. Cl. ............................................ 345/302; 345/328
[58] Field of Search ................................ 395/762, 806, 395/807, 173, 174, 175, 328

[56] References Cited

U.S. PATENT DOCUMENTS

| 5,471,576 | 11/1995 | Yee ............................... | 395/807 |
| 5,481,752 | 1/1996 | Suzuki et al. ................. | 395/800 |
| 5,515,490 | 5/1996 | Buchanan et al. ............ | 395/807 |
| 5,574,843 | 11/1996 | Gerlach, Jr. ................... | 395/118 |
| 5,611,039 | 3/1997 | Nobori et al. .................. | 395/806 |

OTHER PUBLICATIONS

Buchanan et al., "Automatic Temporal Layout Mechanism", Proceedings of the First ACM int'l Conference on Multimedia, 1993, pp. 341–350.

Stotts, "Temporal Hyperprogramming", Journal of Visual Languages and Computing, 1990, pp. 237–253.

Buchanan et al., "Scheduling Multimedia Documents Using Temporal Constraints", Proceedings of the Third International Workshop on Network and Operating System Support for Digital Audio and Video, Nov. 1992, pp. 1–13.

"Scenario based hypermedia: a model and a system, *Hypertext: Concepts, Systems and Applications*"Ogawa et al., Proceedings of the First European Conference on Hypertext, Cambridge University Press, 1990, pp. 39–51.

*Primary Examiner*—Heather R. Herndon
*Assistant Examiner*—Stephen Hong
*Attorney, Agent, or Firm*—Oliff & Berridge, P.L.C.

[57] ABSTRACT

In a multi-media document editing and reproducing system, a multi-media document is created and edited, using scene data as structurization units of the document, by an editor which edits a reproduction sequence relation of multi-media information elements, the relation between scene data is represented in terms of a link between the scene data, while at the time of reproduction, information element data as constituent elements are read out from a multi-media information element control device in the unit of scene data and in accordance with the multi-media document structure created by the editor, then the information elements are reproduced successively and the reproduction of scene data is performed while following the links. In the same system, a continuation attribute which indicates the continuation of reproduction is added to a track after the end of reproduction of the scene data to which the track belongs, and at the time of switchover of scene data in reproduction, a reproduction processing for continuing the reproduction is performed for the track to which the continuation attribute has been designated.

2 Claims, 11 Drawing Sheets

| Media Name | Start(sec) | End(sec) |
|---|---|---|
| Video #3 | 0 | 20.0 |
| Video #4 | 20.0 | 50.0 |
| Audio #2 | 65.0 | 95.0 |
| Trigger #2 | 0 | 30.0 |

MULTI-MEDIA DOCUMENT REPRODUCING SYSTEM, MULTI-MEDIA DOCUMENT EDITING SYSTEM, AND MULTI-MEDIA DOCUMENT EDITING/REPRODUCING SYSTEM

BACKGROUND OF THE INVENTION

1. Field of the Invention

The present invention relates to a multi-media information editing and reproducing system for simultaneously editing, reproducing and displaying a plurality of media information pieces such as images and voices which are controlled by utilization of a computer.

2. Description of the Prior Art

Recently there have been developed multi-media information editing and reproducing systems wherein on a computer system an editor controls a plurality of media information pieces such as images and voices as data operable as display reproduction element and designates the order of display and reproduction, thereby creating and editing them as integrated data (scene).

For example, reference is here made to Ogawa et al., Scenario based hypermedia: a model and a system. HYPERTEXT: CONCEPTS, SYSTEMS AND APPLICATIONS, Proceedings of the First European Conference on Hypertext, CAMBRIDGE UNIVERSITY PRESS, 1990, pp. 39–51. The system described in this literature has a function of combining and structurizing a plurality of scenes and editing and reproducing a multi-media document.

According to the system, such multi-media document is configured using three kinds of objects which are Media, Trigger and Scene.

Media is an abstracted object of data of various media including video, audio, graphics and text. Media contains object reproduction size, reproduction time, type of contents data and parameters according to various types. For example, when the type is video data, reproduction start frame and end frame are designated as parameters indicative of contents.

Trigger is a user interface object which is used for the switchover of scenes. Upon designation by a user through an input device such as a mouse, the Trigger object executes reproduction of a scene which is to be reproduced following link of Trigger.

Scene is an object which integrates plural Media objects and Trigger objects. Scene serves as a structurization unit for a multi-media document.

Figure 9A:
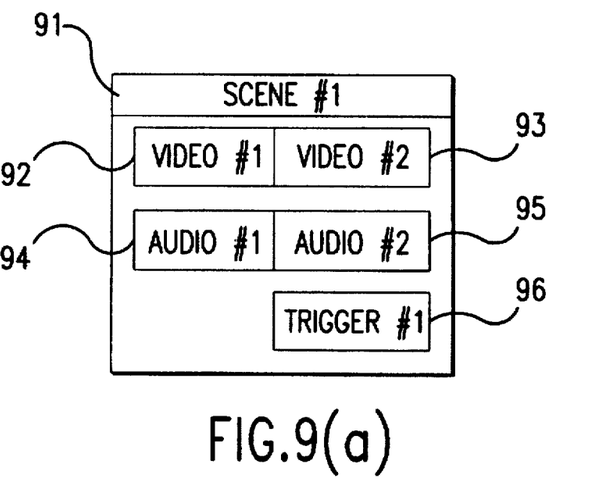
FIGS. 9(a) and (b) are diagrams showing examples of scenes in the prior art.
Figure 9B:
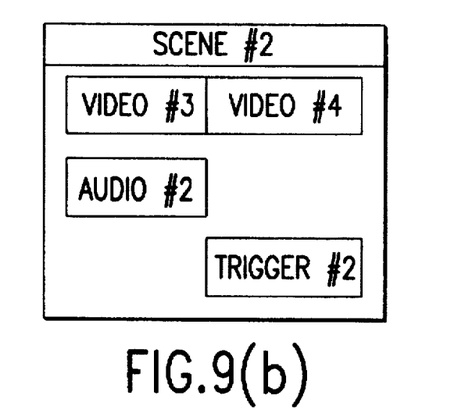
Figure 10A:
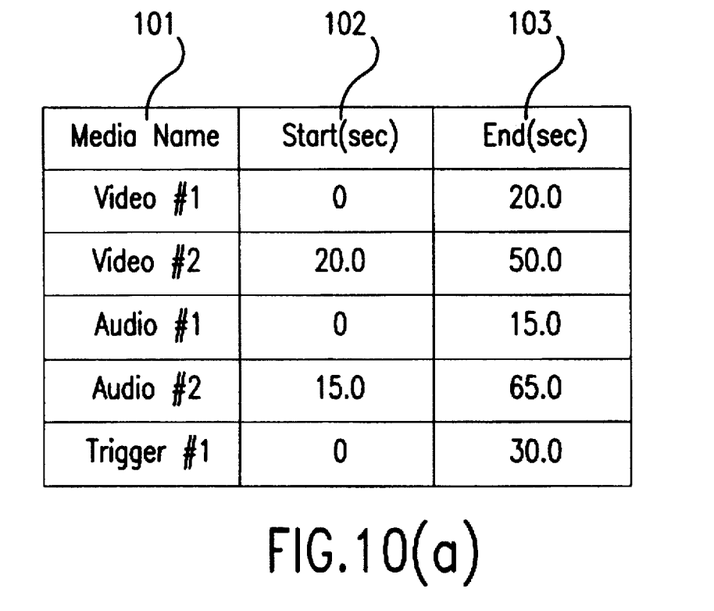
FIGS. 10(a) and (b) are diagrams showing media object reproduction start/end parameters as constituents of scene data.
Figure 10B:
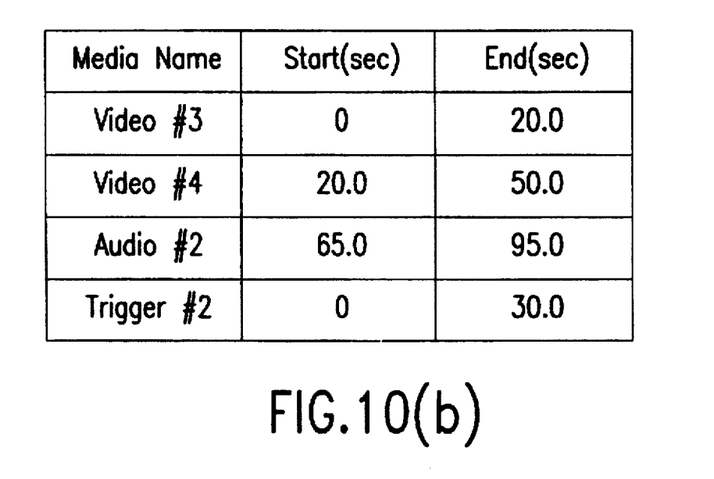

Examples of scenes configured by those objects are shown in FIG. 9. In the same figure, Scene #1 (91) is composed of video media objects of Video #1 (92) and Video #2 (93), audio objects of Audio #1 (94) and Audio #2 (95), and a trigger object of Trigger #1 (96). Likewise, Scene #2 is composed of the objects illustrated therein. Upon designation by a user, Trigger #1 executes switchover of scene to Scene #2. FIG. 10 is a table showing reproduction parameters of media objects included in the Scene #1 and Scene #2. In the same figure, the item MediaName of column 101 indicates the name of media object, and the item Start of column 102 indicates a playback start time (unit: second) of media object. Further, the item End of column 3 indicates a reproduction end time (unit: second) of media object.

Reproduction processing for the Scene #1 is performed in the following manner. First, Video #1 as an object to be reproduced is positioned to the frame of 0 second and reproduction is started from this position. At the same time, Audio #1 is brought into the position indicated by 0 second and reproduction is started from this position. Such a processing is applied each object. As to Trigger #1, upon designation from the user during display time (20 seconds or longer after the start of reproduction of Scene #2), the reproduction of Scene #1 is stopped and that of Scene #1 is started.

Also in the reproduction of Scene #2, alignment is made to the reproduction start point of each object of Video #3 and Audio #2, and reproduction is started from that position.

As shown in the above conventional examples, for each information element of scene, alignment to its reproduction start point is performed and thereafter reproduction is executed from that position.

In a plurality of scenes to be reproduced continuously, information elements having the same contents can be reproduced continuously by designating the reproduction end point of information element belonging to a scene to be reproduced first and the reproduction start point if information element belonging to a scene to be reproduced next, to the same position.

In the foregoing reproduction example of Scene #1 and Scene #2, of the reproduction end point of Audio #2 in Scene #1 and the reproduction start point of Audio #2 in Scene #2 are coincident with each other, it is possible to effect continuous reproduction.

However, it is only when reproduction is performed up to the end of Scene #1 that coincidence is attained between the reproduction end point of a Audio #2 in Scene #1 and the reproduction start point of Audio #2 in Scene #2.

Actually, the switchover of scene from Scene #1 to Scene #2 is started by designation from the user to Trigger. Upon this designation, the reproduction of Scene #1 is terminated. The reproduction start point of Audio #2 in Scene #1 is the reproduction point when the designating operation to Trigger by the user is performed, and it is different from the reproduction end point which has been set for Audio #2 in Scene #1. For this reason it is impossible to effect continuous reproduction.

As shown in this example, the above conventional system involves the problem that it is impossible to continuously reproduce plural information elements of the same contents over a plurality of scenes.

SUMMARY OF THE INVENTION

It is an object of the present invention to solve the above-mentioned problem of the prior art such that it is impossible to continuously reproduce information elements of the same contents over a plurality of continuous scenes. More particularly, it is the object of the present invention to provide a multi-media document reproducing system, a multi-media document editing system and a multi-media document editing/reproducing system which systems can continue reproduction over a plurality of scenes even when there is made switchover of scenes.

According to one aspect of the present invention, there is provided a multi-media document reproducing system including a multi-media information element control means (12) for controlling plural kinds of information elements, a track data control means (111) for controlling track data which is a reproduction sequence information for the said information elements, a scene data control means (13) for controlling scene data which corresponds to a plurality of the said track data, a multi-media document control means (14) for controlling a multi-media document which corresponds to a plurality of the said scene data, and reproducing means (17, 18, 112) which acquires scene data controlled by the scene data control means on the basis of the multi-media document controlled by the multi-media document control means, acquires track data controlled by the track data control means on the basis of the scene data, further acquires information element controlled by the multi-media information element control means on the basis of the track data, and reproduces the said information element, wherein the track data control means also controls track data with a continuation attribute given thereto which continuation attribute represents continuation of the reproduction of the track data even after the end of reproduction of the scene data to which the track data belongs, and the reproducing means performs a reproduction processing to continue the reproduction of track data with a continuation attribute given thereto and which is controlled by the track data control means, after the end of reproduction of the scene data controlled by the scene data control means.

According to another aspect of the present invention, there is provided a multi-media document reproducing system including a multi-media information element control means (12) for controlling plural kinds of information elements, a track data control means (111) for controlling track data which is a reproduction sequence information for the information elements, a scene data control means (13) for controlling scene data which corresponds to a plurality of the track data, a multi-media document control means (14) for controlling a multi-media document which corresponds to a plurality of the scene data, and reproducing means (17, 18, 112) which acquires scene data controlled by the scene data control means on the basis of the multi-media document controlled by the multi-media document control means, acquires track data controlled by the track data control means on the basis of the scene data, further acquires information element controlled by the multi-media information element control means on the basis of the track data and reproduces the information elements, wherein the track data control means also controls track data with a continuation attribute given thereto which continuation attribute represents continuation of the reproduction of the track data even after the end of reproduction of the scene data to which the track data belongs, and the reproducing means performs a reproduction processing to continue reproduction of the track data with a continuation attribute given thereto and which is controlled by the track data control means, for the scene data reproduced previously, at the time of starting the reproduction of scene data controlled by the scene data control means.

According to a further aspect of the present invention, there is provided a multi-media document editing system including a multi-media information element control means (12) for controlling plural kinds of information elements, a track data control means (111) for controlling track data which is a reproduction sequence information for the information elements, a scene data control means (13) for controlling scene data which corresponds to a plurality of the track data, a multi-media document control means (14) for controlling a multi-media document which corresponds to a plurality of the scene data, and editing means (15, 16) for editing the multi-media document controlled by the multi-media document control means, the scene data controlled by the scene data control means and the track data controlled by the track data control means, wherein the track data control means (111) also controls track data with a continuation attribute given thereto which continuation attribute represents continuation of the reproduction of the track data even after the end of the reproduction of scene data to which the track data belongs, and the editing means (15) performs editing to impart a continuation attribute to the track data controlled by the track data control means.

According to a still further aspect of the present invention, there is provided a multi-media document editing and reproducing system including a multi-media information element control means (12) for controlling plural kinds of information elements, a track data control means (111) for controlling track data which is a reproduction sequence information for the information elements, a scene data control means (13) for controlling scene data which corresponds to a plurality of the track data, a multi-media document control means (14) for controlling a multi-media document which corresponds to a plurality of the scene data, reproducing means (17, 18, 112) which acquires scene data controlled by the scene data control means on the basis of the multi-media document controlled by the multi-media document control means, acquires track data controlled by the track data control means on the basis of the scene data, further acquires information element controlled by the multi-media information element control means on the basis of the track data, and reproduces the information element, and editing means (15, 16) for editing the multi-media document controlled by the multi-media document control means, the scene data controlled by the scene data control means and the track data controlled by the track data control means, wherein the track data control means also controls track data with a continuation attribute given thereto which continuation attribute represents continuation of the reproduction of the track data after the end of the reproduction of scene data to which the track data belongs, the editing means performs editing to impart a continuation attribute to the track data controlled by the track data control means, and the reproducing means performs a reproduction processing to continue the reproduction track data with a continuation attribute given thereto and which is controlled by the track data control means, after the end of the reproduction of scene data controlled by the scene data control means.

The multi-media document as an object to be handled by the multi-media document reproducing system, multi-media document editing system, or multi-media document editing and reproducing system according to the present invention is composed of plural scene data, which scene data are each composed of plural track data, the track data each including information which represents a reproduction sequence of plural information elements. These data are controlled by multi-media document control means, scene data control means and track data control means. As information element data which constitutes each track there are plural kinds of data, including voice, character, static image and motion picture, which are controlled by multi-media information element control means.

At the time of reproduction of multi-media document data in the multi-media document reproducing system or the multi-media document editing and reproducing system, the reproducing means acquires scene data controlled by the scene data control means on the basis of the multi-media document controlled by the multi-media document control means, acquires track data controlled by the track data control means on the basis of the scene data, acquires information element controlled by the multi-media information element control means on the basis of the track data, and reproduces the information element. More particularly, first data to be reproduced is taken out from the multimedia document control means and reproduction processing is performed in order from the head scene by the reproducing means. In the scene reproduction processing, a track reproduction processing is executed for each constituent track of scene. The reproduction processing is performed for all of tracks with a continuation attribute not set therein, and at the end of the reproduction processing there is performed a processing to continue the reproduction in the next scene of a track having a continuation attribute. For example, this processing is performed by executing the operation of storing in the track attribute the reproduction break/restart position of information element and information element contents data being reproduced. Then, the scene to be reproduced next is taken out from the multi-media document control means and the above scene data processing is continued. Such a processing is continued until there is no longer any scene to be reproduced next.

At the time of starting the reproduction of scene data a check is made by the track reproduction processing to see if a continuation attribute is set in track data. If as a result it turns out that the continuation attribute has been set, the track data having that value is taken out from the track data control means and there is performed a reproduction restart processing.

Next, irrespective of whether the continuation attribute has been set or not, the reproducing means executes the reproduction processing for the information elements which are track constituting elements.

By the above processing, it is made possible to effect the reproduction of multi-media document data constituted by a series of scenes having tracks whose reproduction is continued even after switchover of scenes.

At the time of editing multi-media document data in the multi-media document editing system or the multimedia document editing and reproducing system according to the present invention, the editing means performs editing of multi-media document controlled by the multimedia document control means, scene data controlled by the scene data control means and track data controlled by the track data control means. For example, there is performed an operation for arranging information elements in track data successively in order to reproduction time and the results are registered in the scene data control means, or the correlation of scenes is edited in the state of links conforming to the reproduction sequence by the editing means and the results are reflected in the multi-media document control means.

The continued track reproduction in the switchover of scenes is recorded in the attribute information of track data. In the editing operation, the attribute information of track data is also edited by the editing means. Where reproduction is to be continued, the continuation attribute of track data is designated to YES. A change of attribute value by the editing means is attended with a change of track continuation attribute.

In the succeeding scene and in the track for reproduction of information element as the contents of track data whose continuation has been designated, a track in the just preceding scene having the contents to be reproduced in the said track is designated as the value of reproduction element attribute. That is, the continuation-designated track does not have any information element, and in the designation of its attribute, a track data for continued reproduction in the just preceding scene is designated.

By the above processing, it is made possible to effect creation and editing of multi-media document data constituted by a series of scenes having tracks whose reproduction is continued even after switchover of scenes.

DESCRIPTION OF THE PREFERRED EMBODIMENT (Embodiment 1)

Figure 1:
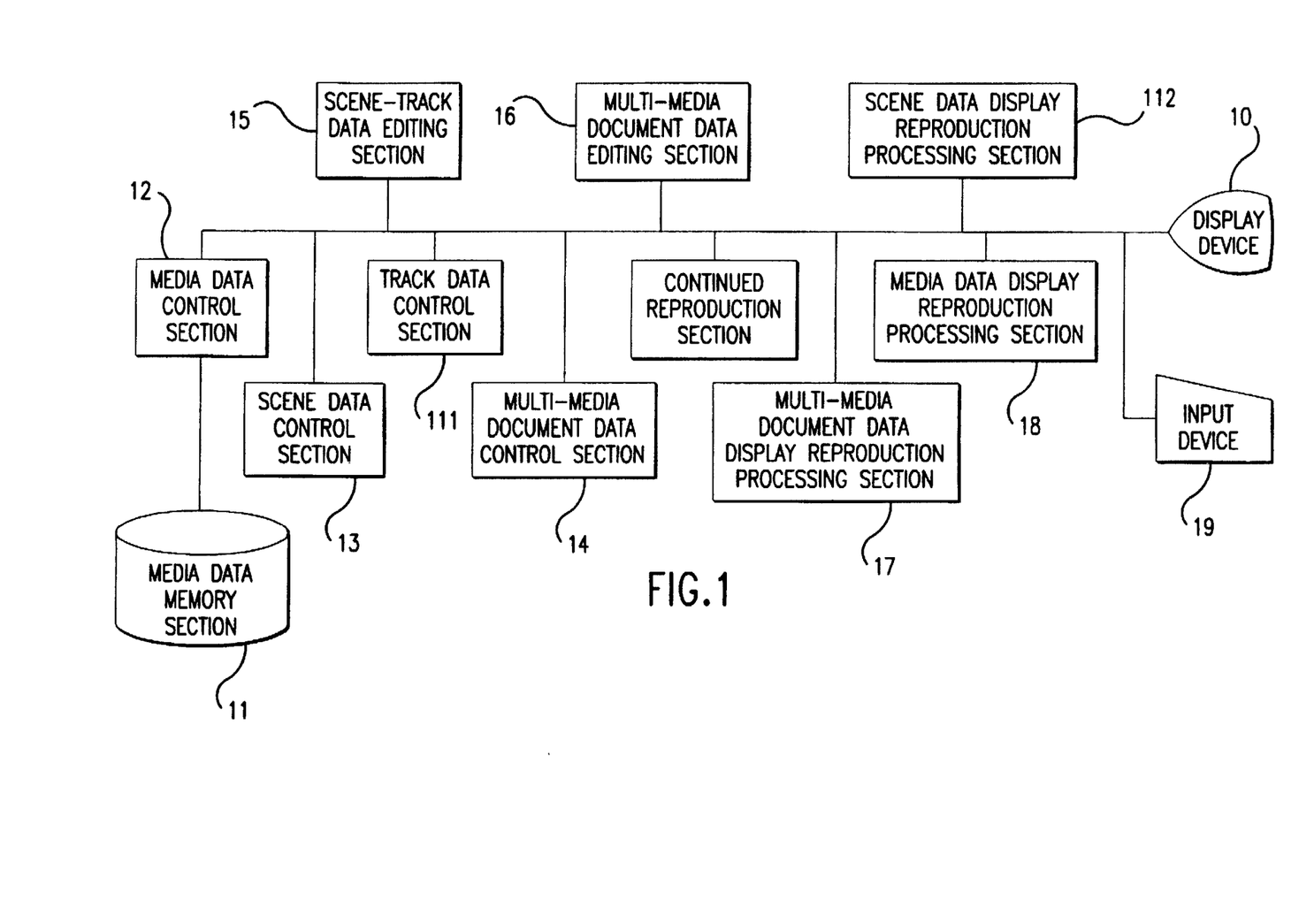
FIG. 1 is a diagram showing a configuration according to an embodiment of the present invention.

FIG. 1 is a diagram showing a schematic configuration of embodiment 1 according to the present invention. A media data memory section 11 stores contents data of display reproduction elements such as cut and sound in the form of image data file and voice data file.

A media data control section 12 controls media data which are structure data having, as members, pointers to type, reproduction time and contents data for absorbing the type dependency of media with a view to handling, unificatively in the system, images, voices, etc. arranged in the track as display reproduction elements.

A scene data control section 13 controls scene data which is a configuration unit of multi-media composite data and which holds one or more track data.

A multi-media document data control section 14 controls multi-media document data which is a data for controlling the scene data in order of reproduction.

A track data control section 111 controls track data which is for controlling the order of display reproduction of the same kind of media data such as images and voices.

A scene track data editing section 15 performs the addition and deletion of tracks for the scene data as well as the addition and deletion of media data for tracks.

A multi-media document data editing section 16 performs changing the sequence of scene data in the multi-media document data swell as the addition and deletion of scene data.

An input device 19 receives designations from the user for the scene track data editing section 15 and the multi-media document data editing section 16.

A display device 10 displays the state of the scene track data editing section 15 and that of the multi-media document editing section 16 and also displays reproduction images of a multi-media document display reproduction processing section 17.

The multi-media document data display reproduction processing section 17 performs display reproduction of multi-media document scene data for the display device 10 in accordance with a reproduction designation according to the contents of multi-media document data.

A media data display reproduction processing section 18 performs display reproduction of each display reproduction element data contained in the scene data, in a designated area.

Figure 2:
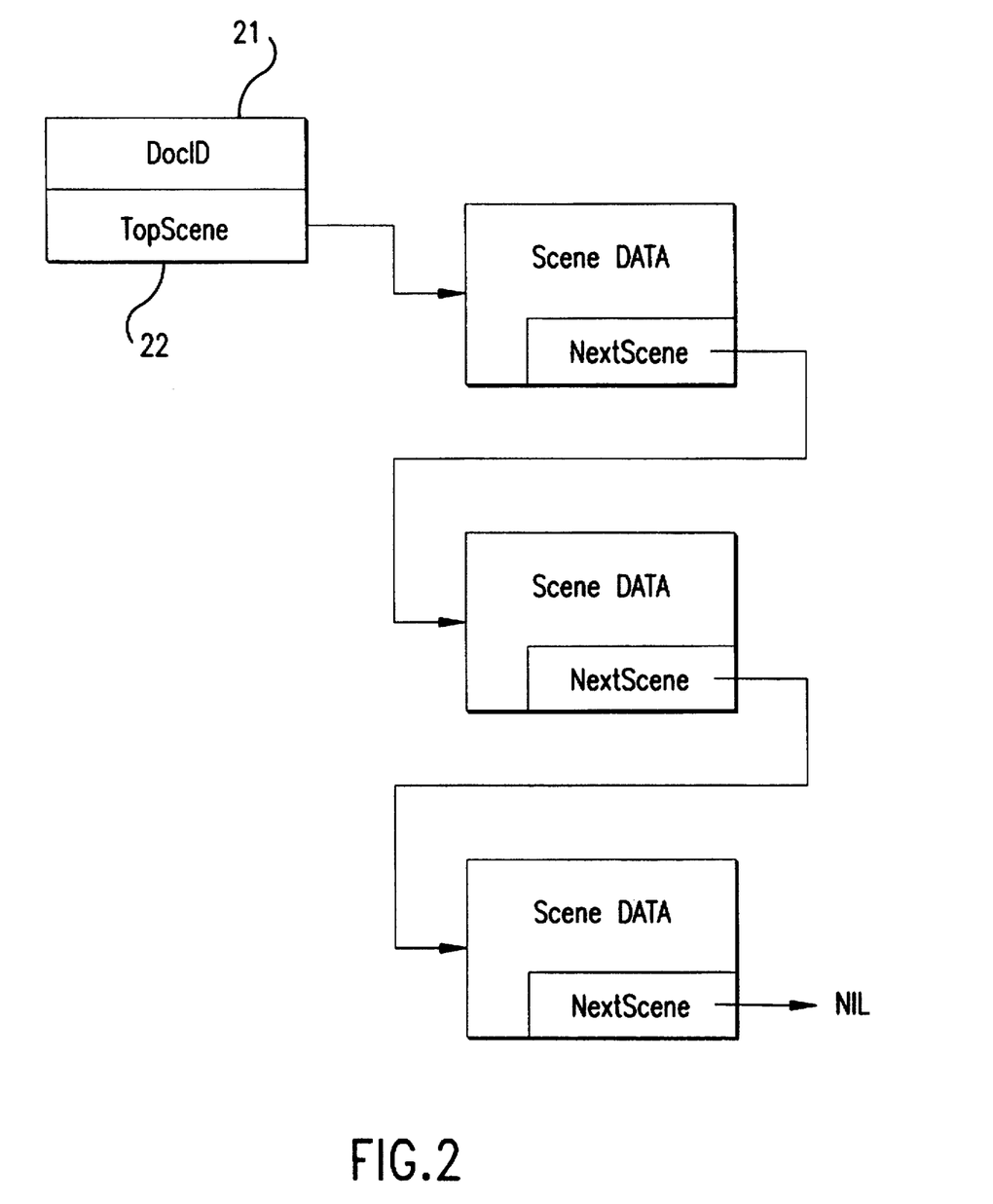
FIG. 2 is a diagram showing the structure of multi-media document data.

FIG. 2 illustrates the structure of the multimedia document data, which data is composed of the following fields.

DocID 21 denotes an identifier of the multimedia document data.

TopScene 22 holds the top scene data of multimedia document. Subsequently, an access to SceneDATA which follows can be made by NextScene field of the scene data.

Figure 3:
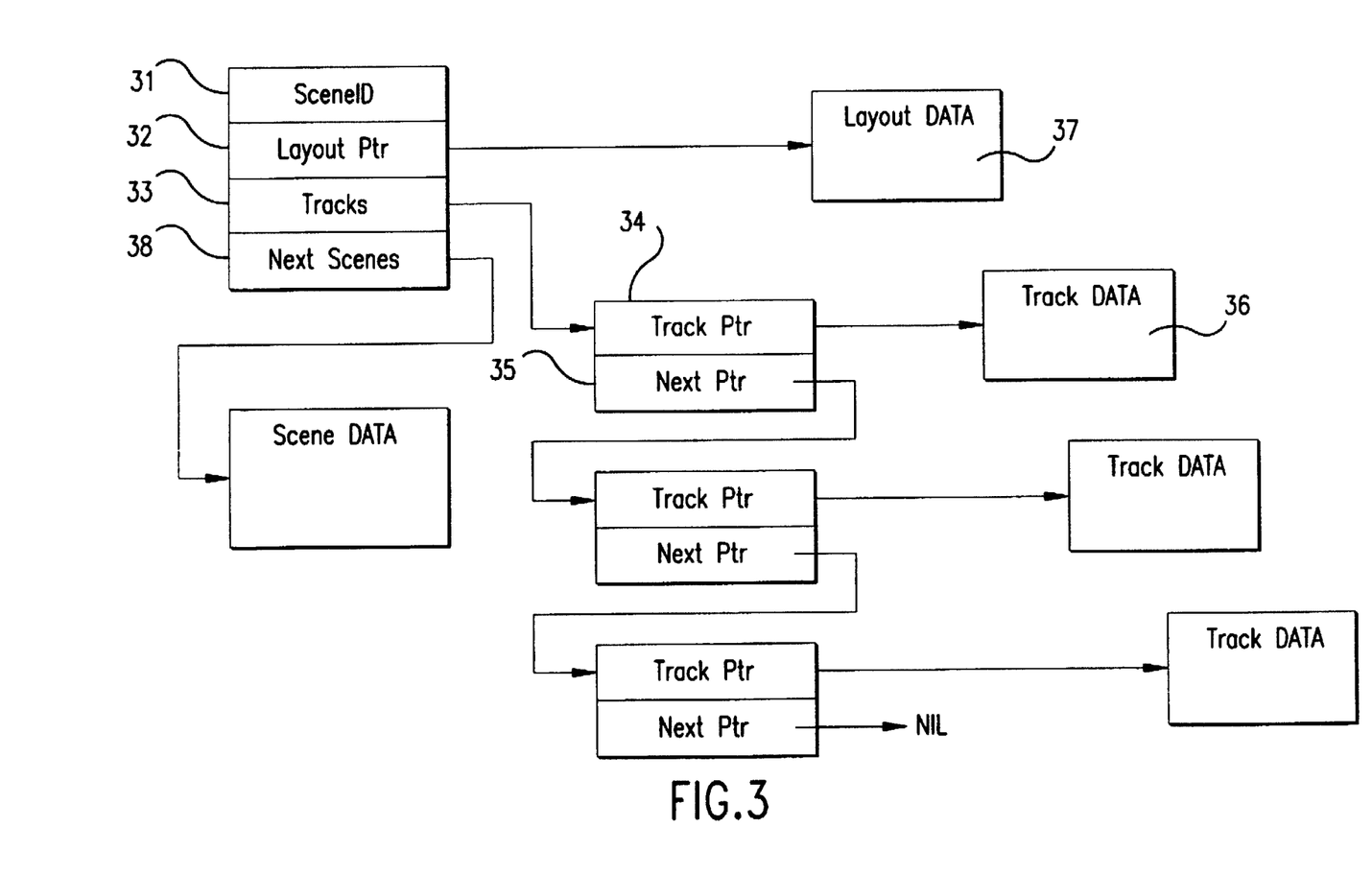
FIG. 3 is a diagram showing the structure of scene data.

FIG. 3 is a diagram showing the structure of the scene data, which data is composed of the following fields.

SceneID 31 denotes an identifier of scene. LayoutDATA 37 denotes a data which designates a display layout of each track belonging to a scene. LayoutPtr 32 denotes a pointer to LayoutDATA. Tracks 33 denotes a pointer to a list of one or more track data, which list is composed of the following data. TrackDATA 36 denotes track data. TrackPtr 34 denotes a pointer to TrackDATA. NextPtr 35 denotes a pointer to the next entry. The termination of the list is expressed by setting the value NIL to NextPtr. NextScene 38 denotes a pointer to scene data to be subsequently reproduced after the end of contents reproduction of the scene data to be reproduced.

Figure 4:
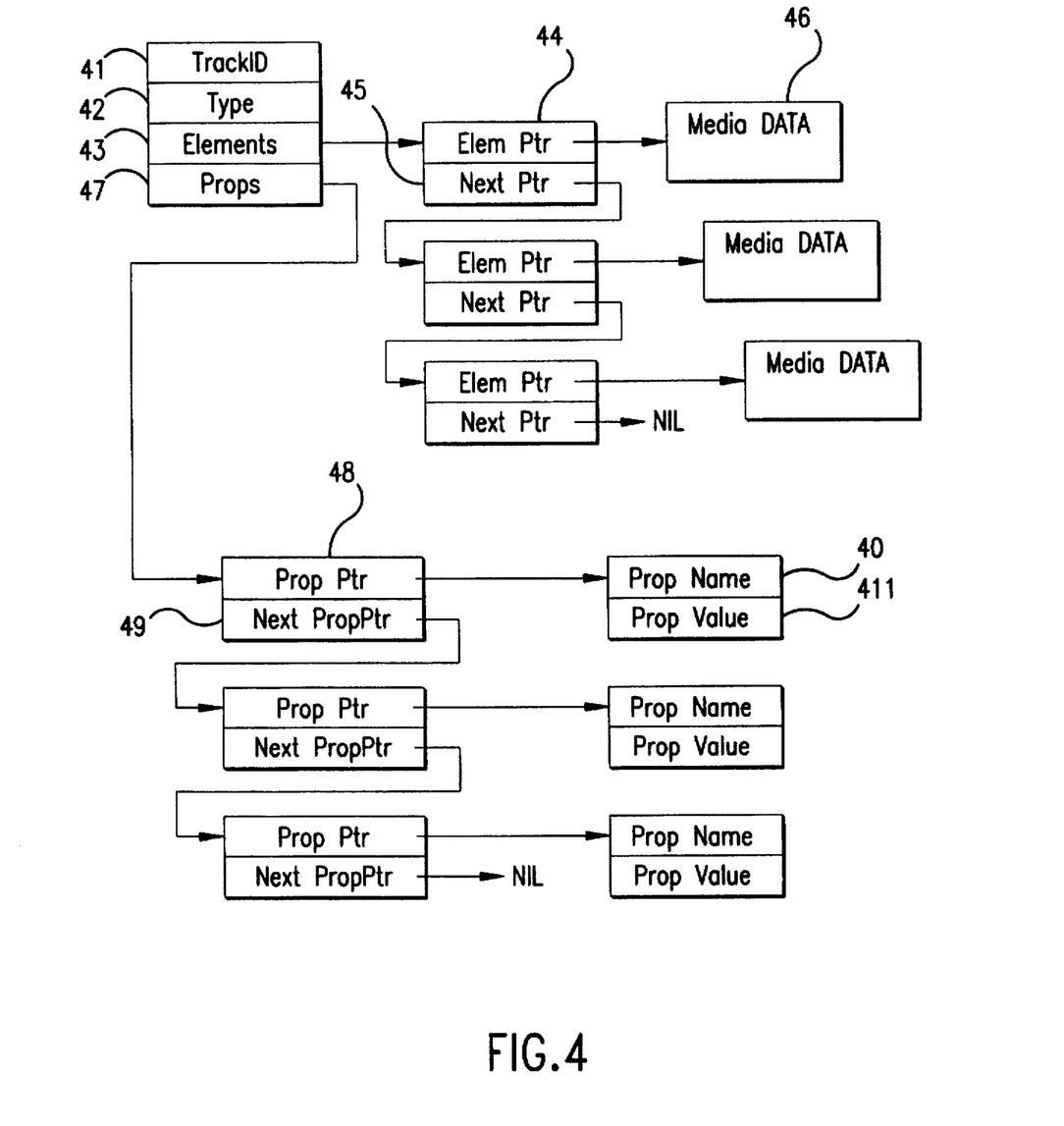
FIG. 4 is a diagram showing the structure of track data.

FIG. 4 is a diagram showing the structure of track data, which data is composed of the following fields.

TrackID 41 denotes a track identifier.

Type 42 designates the type of display reproduction element data to be arranged on a track.

Elements 43 denotes a pointer to a list of display reproduction element data (MediaDATA), which list is composed of the following data. The list sequence represents the sequence of reproduction.

MediaDATA 46 denotes display reproduction element data.

ElemPtr 44 denotes a pointer to MediaDATA.

NextPtr 45 denotes a pointer to the next entry. The termination of the list is expressed by setting the value NIL to NextPtr.

Props 47 denotes a pointer to an attribute list which stores attribute information of track data. The attribute list is composed of the following data. PropPtr 48 denotes a pointer to one attribute data. NextPropPtr 49 denotes a pointer to the next attribute data. The termination of the list is expressed by setting the value NIL to NextPropPtr. Each attribute data is represented by a set of PropName 40 which is an attribute name and PropValue 411 which is an attribute value.

Figure 5A:
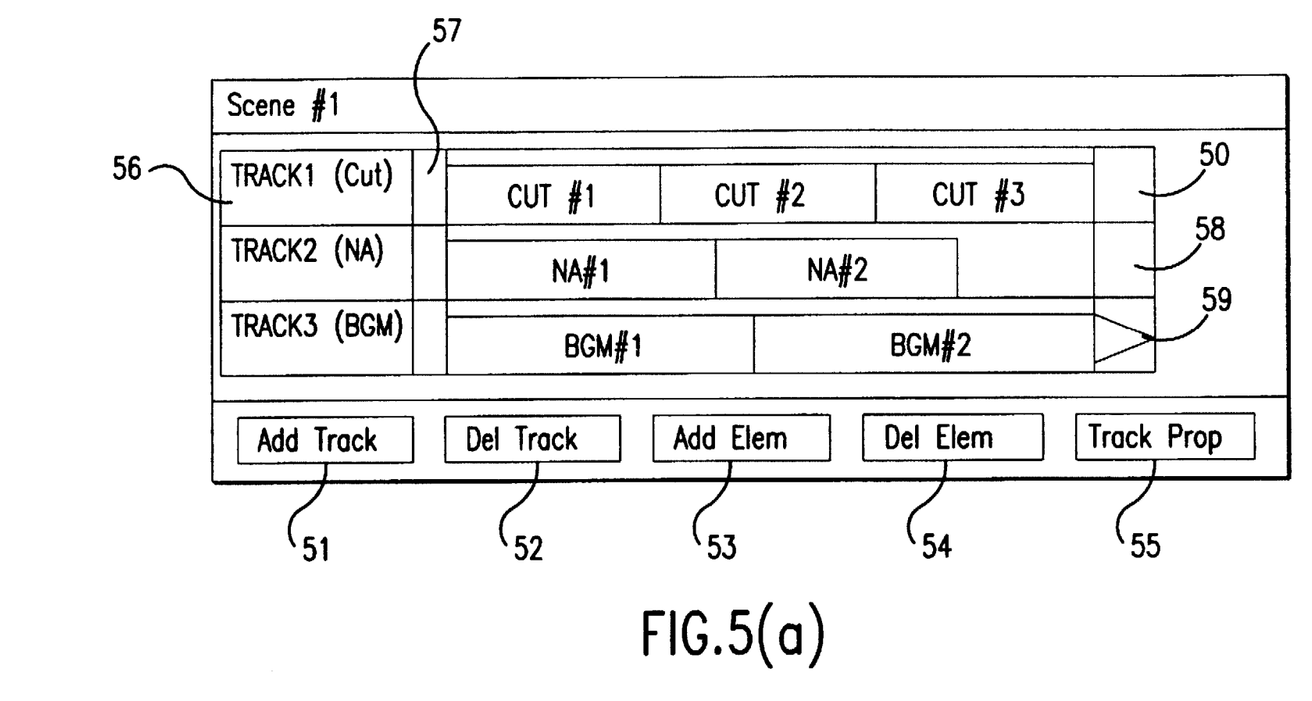
FIGS. 5(a) and (b) are diagrams showing examples of user interface in a scene data editing section.
Figure 5B:
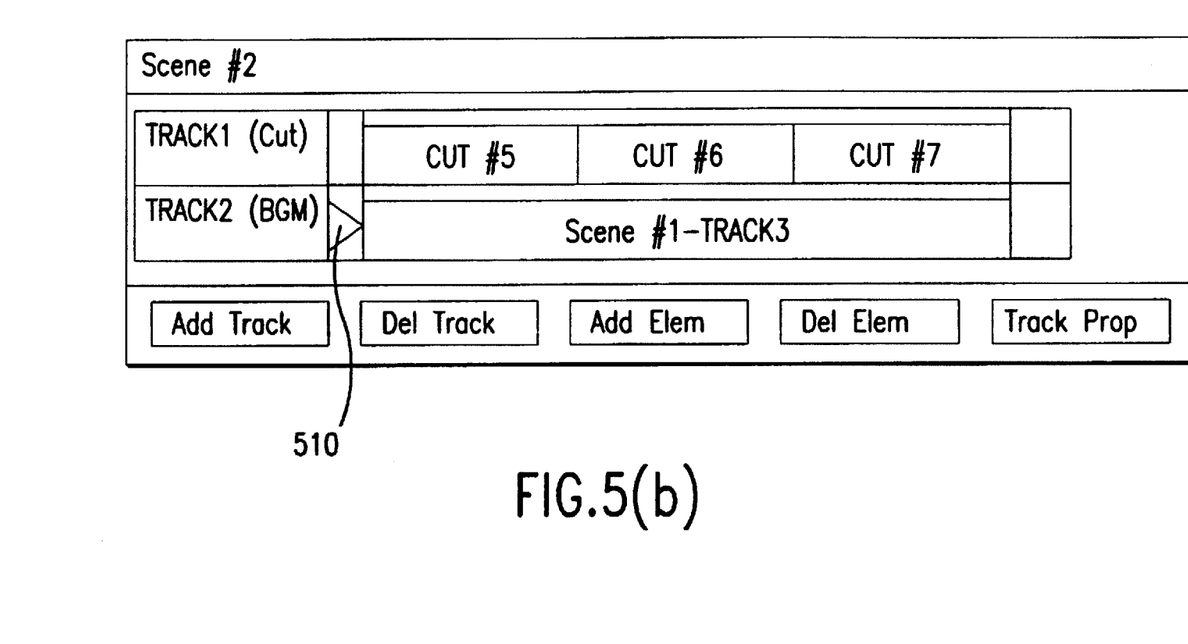

FIG. 5 shows an example of user interface for the scene track data editing section 15, in which the first scene, Scene #1, is shown in (a) and the second scene, Scene #2, is shown in (b). In each track, as in the conventional system, information elements are arranged in order of reproduction along a time line. In FIG. 5(a), buttons 51 to 55 arranged in lower positions are for designating editing operations. By selecting these buttons with an input device such as a mouse it is made possible to effect corresponding editing operations. Information elements 50 to be reproduced are held in track 56 in order of reproduction. In the scene track data editing section 15, information elements are arranged in a time line extending from the left to the right.

Front and rear portions 57, 58 of each track represent a continued reproduction attribute of the track. The rear designating portion 58 is for designating that even after the end of reproduction of the scene, the reproduction of the track concerned is to be continued. In TRACK3(BGM) of Scene #1 in FIG. 5(a), a designation mark 59 indicative of continued reproduction designation is displayed as a result of continued reproduction designation made in the rear designating portion 58. In TRACK2(BGM) of Scene #2 in FIG. 5(b), a designation mark 510 indicative of continued reproduction designation is displayed as a result of continued reproduction designation made in the front designating portion 57. The designation mark 510 based on the front designating portion 57 means that the track concerned is reproduced as continued reproduction of the designated track in the scene which has been designated by its continuation attribute, namely, TRACK3 in Scene #1 in this example.

An explanation will now be given about an example of data in each track which have been edited by the user interface illustrated in FIG. 5. In Scene #1, TRACK1(Cut) is constituted by a chain of information elements CUT#1, CUT#2 and CUT#3 of graphic cut, TRACK2(NA) is constituted by a chain of information elements NA#1 and NA#2 of natural image, and TRACK3(BGM) is constituted by a chain of information elements BGM#1 and BGM#2 of BGM sound. In Scene #2, TRACK1(Cut) is constituted by a chain of information elements CUT#5, CUT#6 and CUT#7 of graphic cut, and TRACK2(BGM)is constituted by information elements of BGM sound, in which track, however, reproduction is made as a continued reproduction of TRACK3 in Scene #1 because a continued reproduction attribute is given to TRACK3(BGM) in Scene #1 and a continued reproduction attribute is designated in front of TRACK2(BGM). Reference will now be made to reproduction images based on the track configuration illustrated in the example of FIG. 5. In Scene #1, images comprising graphic cuts and natural images are changing and at the same time a sound is issuing as BGM, while in Scene #2 there no longer is any natural image and there appear only graphic cuts, and the same sound as in Scene #1 continues to issue as BGM.

Figure 6:
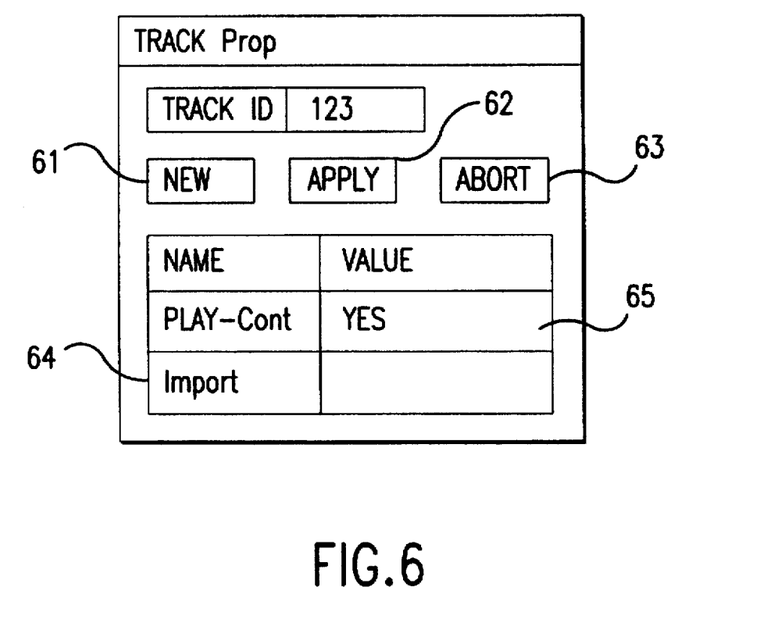
FIG. 6 is a diagram showing an example of user interface for making attribute editing in track.

FIG. 6 shows an example of user interface to perform attribute editing for track.

Addition of a new attribute is performed with NEW button 61. Both attribute name 64 and attribute value 65 are displayed in a tabulated form. A change of the existing attribute is performed by inputting a change value to the corresponding attribute value display portion 65 from an input device. By designating APPLY button 62 through the input device for reflection of the inputted attribute value, the displayed value is reflected in the attribute value. By designating ABORT button 63 the inputted value is discarded and the change of attribute value is not executed.

The following description is now provided about the reproduction processing for a scene which includes a track having a designated continued reproduction attribute.

The multi-media document data controlled in the multi-media document data control section 14 is fed to the multi-media document data reproduction processing section 17 and reproduction is designated.

The multi-media document reproduction processing section 17 takes out the top scene data, TopScene, from the multi-media document data to be reproduced, then transfers it to a scene data display reproduction processing section 112 and trusts it with reproduction processing.

Figure 7:
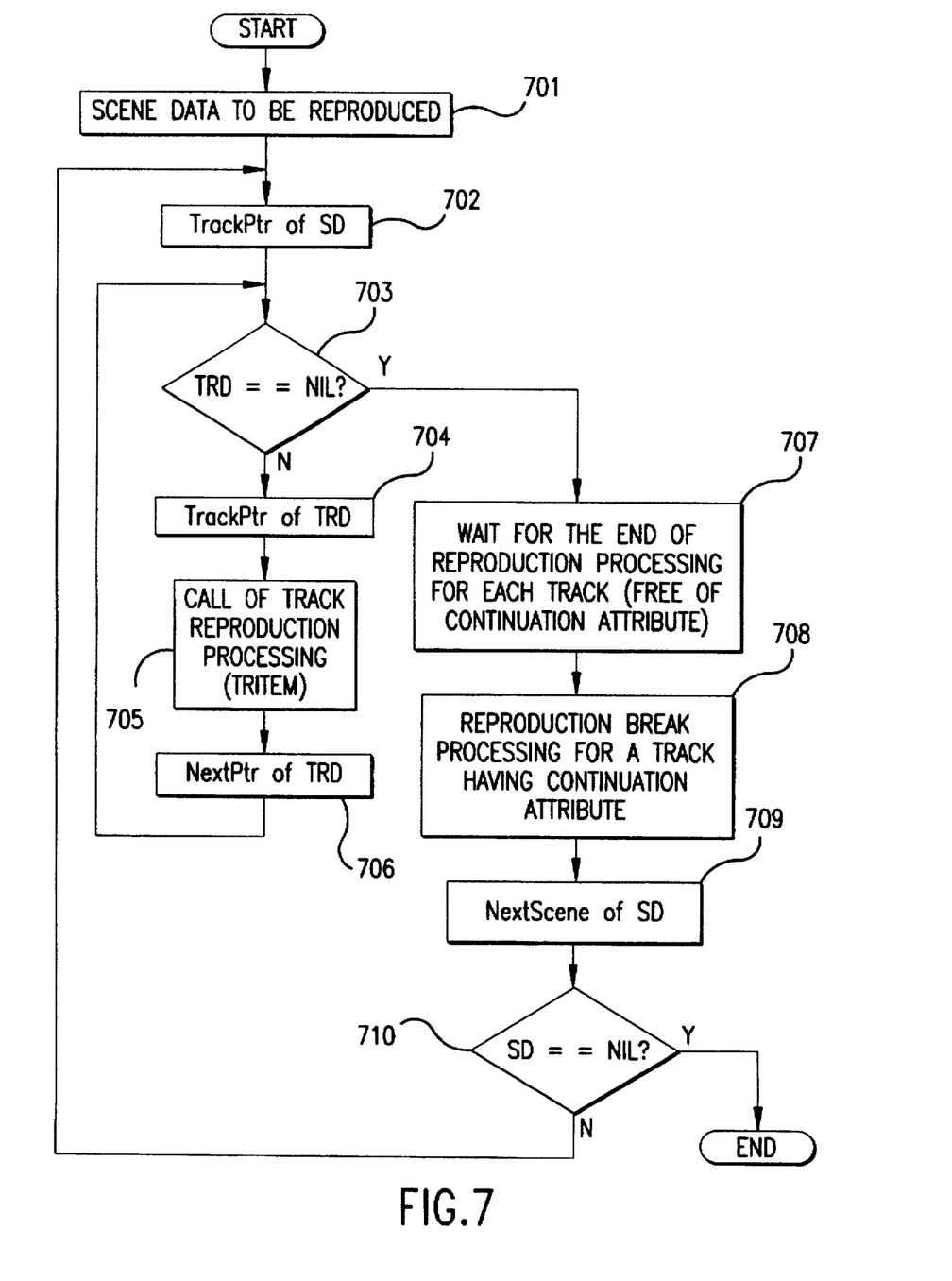
FIG. 7 is a flowchart of processing performed by a scene data display/reproduction processing section.

Next, the scene data display reproduction processing section 112 performs such a processing as shown in the flowchart of FIG. 7 to reproduce data. The scene data reproduction processing will be described below with reference to FIG. 7.

In step 701, a reproduction scene data to be processed is loaded to a scene data area (hereinafter referred to as "SD area") of the scene data display reproduction processing section 112. In step 702, a list of track data 36 is taken out from the scene data control section 13 through the field Tracks 33 and is loaded to a track data area ("TRD area") hereinafter) of the scene data display reproduction processing section 112. In step 703, a check is made to see whether the data value of TRD area is "NIL" or not, thereby checking whether the list is now at its termination or not. If the result of the check is "NIL," it follows that all the track data contained in the list have been taken out. Then, the processing routine shifts to step 707. On the other hand, if the answer is negative in step 703, the processings from step 704 to step 706 are performed and again the check of step 703 is conducted.

In step 704, track data is taken out from the scene data control section 13 through the track pointer TrackPtr in TRD area and is loaded to TRITEM area as a temporary work area. In step 705, a request is made to the media data display reproduction processing section 18 for the execution of display reproduction processing, using track data (TRITEM) as an argument. Upon receipt of the processing request the media data display reproduction processing section 18 returns the control to the calling side. The calling side continues the reproduction processing without waiting for termination of the processing. In step 706, the next track pointer NextPtr present in the TRD area is taken out and loaded to the same area as new data. Then, the processing routine shifts to step 703.

The display reproduction processing for each track is started through the above operations. In step 707, a termination notice of the display reproduction processing for each track is monitored through the media data display reproduction processing section 18. When the receipt of such termination notice has been confirmed with respect to all of the tracks to which has not been designated any continued reproduction attribute, the scene data display reproduction is completed. In step 708, a reproduction break processing is executed for a track to which has been designated a continued reproduction attribute. In step 709, the scene data to be reproduced next to the scene data whose reproduction has been terminated is taken out from the scene data control section through the field NextScene and is loaded to the SD area of the scene data display reproduction processing section. In step 710, a check is made to see if the value of SD is "NIL" or not. If the answer is affirmative, it follows that t there is no scene data to be reproduced next, and all the processings of the scene data reproduction processing section are over. On the other hand, if the answer is negative and there is a scene data to be reproduced next, the processing routine returns to step 702 for the repetition of processings.

Figure 8:
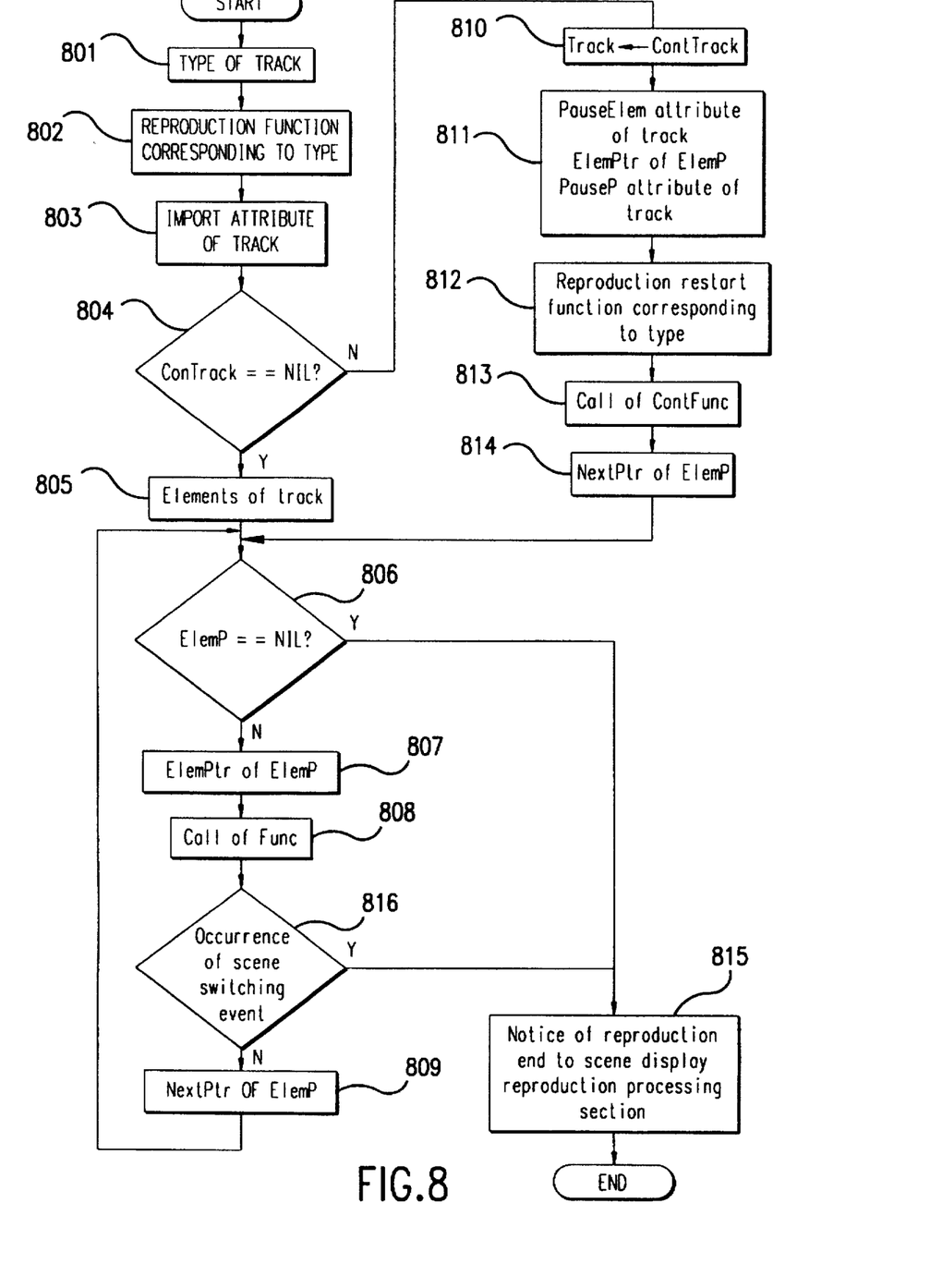
FIG. 8 is a flowchart of processing performed by a media display/reproduction processing section.

Next, the reproduction processing for the track data in each scene will be described below with reference to the flowchart of FIG. 8.

The display reproduction processing for the display reproduction element data in each track is executed by the media data display reproduction processing section 18. The processing requesting side delivers track data as an argument to the processing section 18. In FIG. 8 the track data is described as Track.

In step 801, the type of display reproduction element data belonging to the track is taken out from Track through Type and is loaded to Type area as a temporary work area. In step 802, a reproduction function corresponding to the type of display reproduction element data is acquired from the media data control section 12 and is loaded to Func area. In step 803, the value of Import attribute included in Track attributes is taken out and is loaded to ContTrack area. If the track to be reproduced has been designated for continued reproduction of a track belonging to another scene, this attribute value serves as reproduction continuing track data.

In step 804, the value held in the ContTrack area is checked and if it is NIL, there is performed processing on the assumption that the track is an ordinary track which holds a reproduction element in the field Elements 43. In step 805, for the extraction of information element, a list of display reproduction element data MediaDATA 46 is taken out from the track data control section 111 through the field Elements 43 of track data Track 36 and is loaded to ElemP area as a temporary work area. Then, the processing routine shifts to step 806 for the reproduction processing of each display reproduction element data (information element).

In the check of step 804, if the value held in ContTrack area is not "NIL," this means that the track concerned has been designated for continued reproduction of a track belonging to another scene. A reproduction restart processing for the track is executed by the operations of steps 810 to 813. In step 810, the value of ContTrack is loaded to the temporary work area Track.

Next, since the pointer ElemPtr of information element which was being reproduced at a break point has been recorded as PauseElem attribute, that value is taken out and loaded to the temporary work area ElemP. Then, the display reproduction element data MediaDATA is taken out through the pointer ElemPtr which is held in the area ElemP, and is loaded to the temporary work area Media. Further, since a reproduction break position information of media data at the reproduction break point is stored as PauseP attribute, it is taken out and loaded to the temporary work area PauseP. Through these operations it was possible to obtain the reproduction break point information.

In step 812, a reproduction function (a reproduction restart function) for restarting the reproduction from the break point corresponding to the type of display reproduction element data is taken out from the media data control section 12. In step 813, the reproduction restart function is applied, together with the break point information, to the display reproduction element data MediaData as reproduction break-point data to restart the reproduction processing. In step 814, for taking out the next information element after termination of the reproduction restart, display reproduction element data MediaDATA is taken out through the pointer ElemPtr which is held in ElemP area, and is loaded to Media area. Thereafter, the processing routine shifts to step 806 for the ordinary information element reproduction processing.

In steps 806 et seq. there are performed the same processings irrespective of whether there is a designation of continued reproduction or not. In step 806, a check is made to see if the value held in ElemP area is "NIL" or not, thereby checking whether the track data list is at its termination or not. If the value held in ElemP area is "NIL," it follows that the process is completed for all the display reproduction element included in the list, and in this case the processing routine shifts to step 815. On the other hand, if the answer in step 806 is negative, the processings of steps 807 to 809 are performed and again the check of step 806 is conducted. In step 807, the display reproduction element data MediaDATA is taken out from the media data control section 12 through the pointer ElemPtr which is held in ElemP area, and is loaded to Media area. In step 808, by applying the display reproduction element data held in MediaD area to the reproduction function held in Func area there is executed the display reproduction processing for the same data.

In step 816, a check is made to see if there occurred a scene switching event during the execution of step 808. If the answer is affirmative, the reproduction of the track being reproduced is terminated. More particularly, the processing routine shifts to step 815 for a termination processing. On the other hand, if the answer is negative in step 816, the processing routine advances to step 809 to continue the reproduction processing. In step 809, the pointer to the next element, NextPtr, held in ElemP area is taken out and is loaded as new data to ElemP area. Then, the processing routine shifts to step 806.

In step 815, when the value held in ElemP area is found to be NIL in step step 806, a end notice is transmitted to the calling side of the display reproduction processing.

The processing of the media data display reproduction processing section 112 is now over.

By the processing procedure set forth above it becomes possible to effect the reproduction processing for the scene having a track whose continued reproduction can be done even after the end of the scene data reproduction.

Although in connection with the document editing and reproducing system of the above embodiment a description has been made about an example wherein the continued reproduction attribute can be given to the tracks of all media, there may be provided a limiting means which permits the continued reproduction attribute to be given to only a specific media track. Generally, in the display reproduction of a multi-media document, there is used a combination of a main medium as foreground and an auxiliary medium as background. An example is a sound used as BGM for image or a static image used as background for motion picture. In many cases, the same medium as background is used continuously over a plurality of scenes. On the other hand, as to the main medium, it is rarely the case that the same information is repeated over a plurality of scenes. Therefore, by making limitation with the aforesaid limiting means so as to impart the continued reproduction attribute to only the track of a medium which is very likely to be given the same attribute, it is possible to prevent the continued reproduction attribute to be given carelessly even to a track whose continued reproduction after the end of scene reproduction is not proper.

In the display reproduction, if the background medium is too conspicuous, it affects the impression of the main medium, thus leading to a counter effect. For example, it is desired in some case that the sound used as BGM be as quiet as possible. In the case where the continued reproduction attribute is given to cope with such a case, there may be used a means for changing the reproduction characteristics of the media concerned automatically. For example, when the continued reproduction attribute has been designated to a sound track, there may be adopted a configuration for reducing the volume automatically. In the case of a static image, such a reproduction characteristic as lightness or saturation is lowered in order to make it less conspicuous than the main image.

According to the present invention, as set forth above, by imparting a continuation attribute which designates continued reproduction to a track as a constituent element of a multi-media document, it becomes possible handle the continuously reproduced track in the form of a structurized multi-media document. More particularly, according to the present invention, since the multi-media document data is constituted by a series of scene data having track data to which the continuation attribute can be imparted, it is possible to realize a multi-media document reproducing system capable of continuing reproduction over a plurality of scenes. Further, a multi-media document editing system for such document reproduction can also be realized by a simple configuration.

What is claimed is:

1. A method for reproducing scene data with a multi-media document reproducing system, said method comprising the steps of:

loading scene data to be processed to a scene data area;

taking a list of track data out of a scene data control section and loading said list of track data to a track data area;

taking track data out of said scene data control section through a first track pointer in said track data area and loading said track data to a temporary work area;

executing display reproduction processing using said track data loaded into said temporary work area as an argument; and taking out a second track pointer from said track data area and loading said second track pointer to a same area as new data from said list of track data.

2. A method for reproducing track data in a first scene with a multi-media document reproducing system, said method comprising the steps of:

taking a type of display reproduction element data belonging to said track data from said track data and loading it to a first temporary work area;

taking a reproduction function corresponding to said type of display reproduction element data from a media data control section and loading said reproduction function to a function storage area;

taking a value of an attribute corresponding to said track data, wherein said attribute represents whether said track data is designated for continued reproduction of a track belonging to a second scene, and loading said value of said attribute to a second storage area;

checking said value of said attribute and if said value indicates that said track data is designated for continued reproduction of a track belonging to said second scene, restarting processing of said track belonging to said second scene by loading said value to a second temporary work area and applying a reproduction restart function from said media data control section together with break point information corresponding to a break-point at which reproduction of said second scene was broken to a display reproduction element data also corresponding to said break-point.

* * * * *